Oct. 10, 1967 R. G. DELBUGUET 3,345,774
PLANT WATERING AND FEEDING DEVICE
Filed Dec. 8, 1965
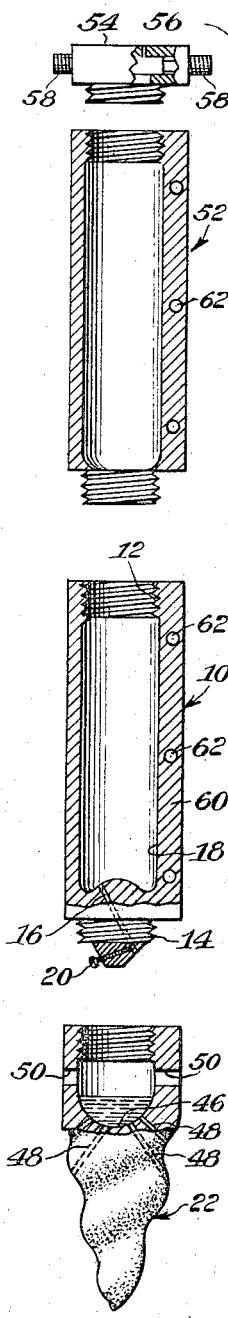
FIG. 1
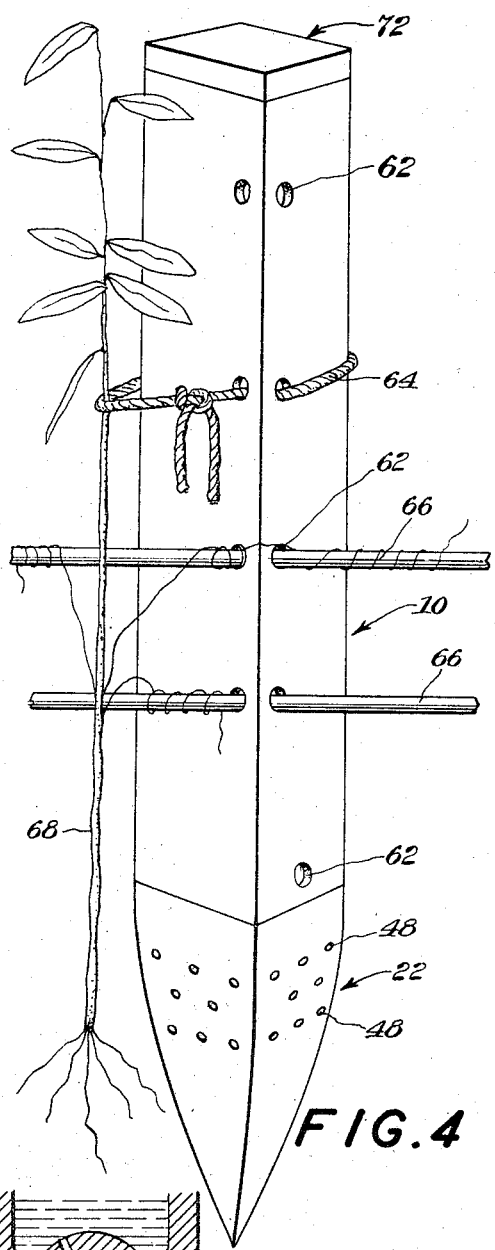
FIG. 2
FIG. 4
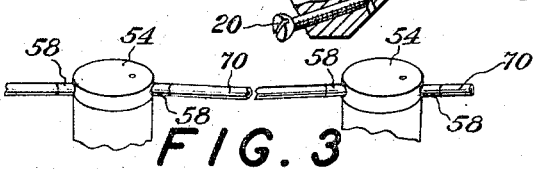
FIG. 3
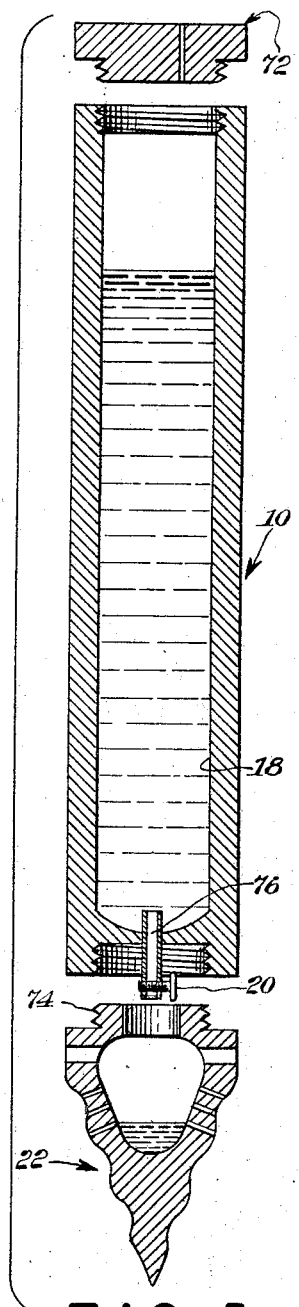
FIG. 5
INVENTOR.
RENE G. DELBUGUET

United States Patent Office 3,345,774
Patented Oct. 10, 1967

---

3,345,774
PLANT WATERING AND FEEDING DEVICE
Rene G. Delbuguet, 1209 Guy St., Montreal, Quebec, Canada
Filed Dec. 8, 1965, Ser. No. 512,481
4 Claims. (Cl. 47—48.5)

ABSTRACT OF THE DISCLOSURE

A plant watering and feeding device which can be used to supply water and/or plant nutrients directly to the roots of a plant at a controlled rate, for example a slow rate, and for as long a period as necessary.

---

Brief description of the drawings

FIG. 1 is a side cross sectional view of one form of my invention;

FIG. 2 is a detail cross sectional view of a portion of the device shown in FIG. 1;

FIG. 3 is a detail view showing the interconnection of a plurality of the devices shown in FIG. 1;

FIG. 4 is a perspective view of an alternative form of my device; and

FIG. 5 is a cross sectional view of the device shown in FIG. 4.

Detailed description of preferred embodiments

Referring now to FIGS. 1-3, there is shown a first vertical hollow tube 10 having an upper open internally threaded end 12 and a lower generally tapered solid conical section 14 having an exterior thread. An inclined hollow tube 16 open at both ends extends all the way through section 14 into the hollow interior 18 of tube 10. The base of section 14 carries a manually adjustable screw 20 which extends into tube 16 and acts as a needle valve to control the rate of flow of water and or plant nutrients (when placed in interior 18) through tube 16.

A fluid feed tip 22 having its apex pointing downward and having a gross exterior thread for screwing into the ground has an open internally threaded end threadedly engaging section 14. Tip 22 has an interior reservoir 46 adapted to receive any fluid flowing through tube 16. Tip 22 has a plurality of inclined hollow conduits 48 through which fluids in the reservoir can flow by gravity to the exterior of the tip. In addition tip 22 has a plurality of holes 50 through which a screwdriver tip can be inserted for adjustment of screw 20.

One or more additional hollow sections 52 open at both ends can be screwed together vertically one on top of the other, with the lowest of these sections being screwed into the top of tube 10. These sections permit the length of the device to be varied as necessary.

The top open end of the device, which is internally threaded, is adapted to removably receive a screw cap 54. Cap 54 has an opening 56 communicating both with the hollow interior of the device and to horizontally extending hollow nipples 58 open at both ends.

The wall or casing 60 of the device is provided with holes 62 through which cords or ribbons 64 or rods 66 can extend to support a plant 68.

In use, the device is screwed into the ground until tip 22 communicates with the plant roots, and the water and/or plant nutrient flows thereto.

As shown in FIG. 3, a plurality of these devices can be fed with water and/or plant nutrients on a continuous or intermittent basis through hollow tubing 70 connected both to a source and between adjacent nipples 58.

The cross section of the hollow interior can be circular or rectangular. Similarly, the outer surface can be cylindrical or square.

In the modification of FIGS. 4 and 5, the screw cap 72 can have a vent channel but is otherwise sealed. Moreover, the tip can have curved sharp edges without thread (FIG. 4) or can be of the type shown in FIGS. 1–3, but with an upper opening having an outer thread 74 engaging an inner bottom thread of section 10. In this case (FIG. 5), a vertical hollow tube 76 open at both ends extends between the interior of section 10 and the reservoir and has an adjustment screw 20 controlling the flow of water and/or plant nutrients as before.

My device can be of metal or molded plastic suitably colored and of various lengths as described. It is believed obvious that any desired rate of flow of water and/or plant nutrients can be directed directly at plant roots for as long a time as is required with use of my device.

While I have described my invention with particular reference to the drawings, my protection is to be limited only by the terms of the claims which follow.

Having thus described my invention, I claim as new and desire to secure by Letters Patent:

1. A plant feeding and watering device comprising a vertical hollow tube having an outer wall with a plurality of holes extending therethrough, said holes being adapted to receive plant tying means, a screw cap removably secured to the top end of said tube, a tapered tip having a downwardly pointing apex and an upper end adapted to be removably secured to the bottom end of said tube, said tip having a reservoir and a plurality of hollow channels extending between said reservoir and the exterior surface of said tip, and means including a needle valve interconnecting the interior of said tube to said reservoir.

2. A device as set forth in claim 1 wherein said cap has an opening communicating with the interior of said tube and a pair of oppositely disposed hollow nipples open at both ends and communicating with said opening.

3. A device as set forth in claim 1 wherein said means includes a hollow tube coupled at one end to the interior of the vertical tube and at the other end to said reservoir and a manually adjustable screw extending into said tube intermediate the ends.

4. A device as set forth in claim 1 wherein said tip is provided with orifices permitting access to said needle valve.

References Cited

UNITED STATES PATENTS

| 445,510   | 1/1891  | Black  | 11—7.1   |
|-----------|---------|--------|----------|
| 1,984,265 | 12/1934 | Hamer  | 47—48.5  |
| 2,435,539 | 2/1948  | Gould  | 47—44 X  |
| 3,142,935 | 8/1964  | Campos | 47—48.5  |

FOREIGN PATENTS

| 267,721 | 3/1922  | Australia. |
| 164,374 | 11/1949 | Austria.   |
| 384,156 | 10/1923 | Germany.   |

ABRAHAM G. STONE, *Primary Examiner.*

ROBERT E. BAGWILL, *Examiner.*